United States Patent
Sano et al.

(10) Patent No.: US 6,445,872 B1
(45) Date of Patent: Sep. 3, 2002

(54) RECORDING AND REPRODUCING APPARATUS FOR RECORDING DIGITAL BROADCAST COMPRESSION-CODED DATA OF VIDEO SIGNALS OF A MULTIPLICITY OF CHANNELS

(75) Inventors: Nobuya Sano, Nara; Makoto Iida, Hirakata, both of (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/194,232

(22) PCT Filed: May 22, 1997

(86) PCT No.: PCT/JP97/01717
§ 371 (c)(1),
(2), (4) Date: Nov. 23, 1998

(87) PCT Pub. No.: WO97/46013
PCT Pub. Date: Dec. 4, 1997

(30) Foreign Application Priority Data

May 24, 1996 (JP) .............................................. 8-129508

(51) Int. Cl.⁷ ................................................ H04N 5/91
(52) U.S. Cl. .......................... 386/46; 386/108; 386/124
(58) Field of Search ................................ 386/1, 33, 46, 386/83, 109, 111–112; 725/134, 142, 153, 133, 141, 68

(56) References Cited

U.S. PATENT DOCUMENTS

| | | | | | |
|---|---|---|---|---|---|
| 4,774,597 A | * | 9/1988 | Harvey | ......................... | 386/92 |
| 4,862,292 A | * | 8/1989 | Enari et al. | .................... | 360/8 |
| 5,187,589 A | * | 2/1993 | Kono et al. | .................... | 386/83 |
| 5,371,551 A | * | 12/1994 | Logan et al. | ................ | 348/571 |
| 5,418,782 A | * | 5/1995 | Wasilewski | ................. | 370/486 |
| 5,619,337 A | * | 4/1997 | Naimpally | .................... | 386/83 |
| 5,625,504 A | * | 4/1997 | Okada et al. | ................. | 360/27 |
| 5,878,187 A | * | 3/1999 | Kubota et al. | ................ | 386/83 |
| 5,963,702 A | * | 10/1999 | Yamashita | .................... | 386/46 |
| 6,011,901 A | * | 1/2000 | Kirsten | ........................ | 386/123 |
| 6,169,844 B1 | * | 1/2001 | Arai | ............................ | 386/83 |

FOREIGN PATENT DOCUMENTS

| | | |
|---|---|---|
| EP | 0 712 247 A2 | 5/1996 |
| JP | 3-176801 | 7/1991 |
| JP | 8-111002 | 4/1996 |
| JP | 8-111068 | 4/1996 |
| JP | 8-125973 | 5/1996 |
| JP | 8-339630 | 12/1996 |
| JP | 9-200691 | 7/1997 |
| WO | 92/22983 | * 12/1992 |

* cited by examiner

*Primary Examiner*—Andrew Christensen
*Assistant Examiner*—Po-Lin Chieu
(74) *Attorney, Agent, or Firm*—Akin, Gump, Strauss, Hauer & Feld, L.L.P.

(57) ABSTRACT

A bit stream which is a data string including coded data of a multiplicity of channels is output from a tuner section 22, and a recording channel selection section 23 selects coded data of a desired channel from the bit stream and output by configuring the data string. The data string output from the recording channel selection section 23 is recorded to and reproduced from a magnetic tape of a recording and reproducing section 24 by a rotary head. The coded data of the data string reproduced from the recording and reproducing section 24 is discompression-encoded by an MPEG2 decoder 25 and a video signal is output.

11 Claims, 6 Drawing Sheets

RECORDING AND REPRODUCING APPARATUS FOR RECORDING DIGITAL BROADCAST COMPRESSION-CODED DATA OF VIDEO SIGNALS OF A MULTIPLICITY OF CHANNELS

TECHNICAL FIELD

The present invention relates to a digital broadcast recording and reproducing apparatus for receiving, recording and reproducing television broadcasts of a digital format.

BACKGROUND ART

Although television broadcasts are presently provided in the analog format, it is considered that the analog television broadcasts will be successively replaced by digital television broadcasts (hereinafter, referred to as digital TV broadcasts) in the future because of the necessities of further improvement of image quality and increasing the number of broadcast channels.

In the digital TV broadcast, by compression-coding video signals, a multiplicity of channels can be secured within a limited frequency band. In a presently-proposed digital TV broadcast, an MPEG2 format which is a video signal compression coding format standardized by a working group of the moving picture experts group (hereinafter, referred to as MPEG) is used for compression-coding of the video signals. Video signals are compression-coded into coded data according to the MPEG2 format. The coded data of a multiplicity of channels (e.g. eight channels) are brought together into a bit stream which is a data string. The bit stream is modulated and transmitted as a digital broadcast signal.

On the other hand, for recording of television broadcasts at home, presently, a video tape recorder of the VHS format which is an analog format is mainly used (hereinafter, referred to as VHS format VTR). Moreover, recently, digital video tape recorders based on the DV format standardized by "the HD digital VCR conference" which is a conference for examining home digital VTR standards have been put on the market (hereinafter, referred to as DV-format VTR), so that high-image-quality recording has been possible.

FIG. 6 shows a system configuration in the case of recording, by the DV format VTR, a program of a digital TV broadcast received by use of a digital TV broadcast receiver 120 commercially available as "Set Top Box."

In FIG. 6, reception signals of radio waves from a satellite received by an antenna 110 are input to an antenna input terminal 121 of the receiver 120 for receiving digital TV broadcasts. The signals input from the antenna input terminal 121 are demodulated by a tuner section 122, and a bit stream is output. From the bit stream, the data string of a desired channel is selected by a channel selection section 123, and the selected data string of the channel is decompression-decoded and put back into video signals according to the MPEG2 format by an MPEG2 decoder 124. The video signals are output to a video output terminal 125. Then, the video signals are input to a video recording input terminal 131 for inputting recording video signals of a DV format VTR 130. The input video signals are reproduced by way of an encoder 132 for video signal compression coding of DV-format (hereinafter, referred to as DV encoder), a recording and reproducing section 133 and a decoder 134 for decompression-decoding of DV-format video signals (hereinafter, referred to as DV decoder), and the reproduced video signals are output to a video reproduction output terminal 135. The reproduced video signals are displayed on a monitor image receiving apparatus 140.

The operation to record and reproduce a program of a digital TV broadcast to and from the format DV VTR in the above-described configuration will be described in detail hereafter.

Radio waves of a digital TV broadcast from a satellite are received by the antenna 110 and supplied to the receiver 120. At the receiver 120, the signals are received by the antenna input terminal 121 and demodulated by the tuner section 122 into a bit stream. The bit stream is input to the channel selection section 123 and the data string of a desired channel is selected. The selected data string is decompression-decoded by the MPEG2 decoder 124 and put back into video signals, and are output to the video output terminal 125. At the DV format VTR 130, the video signals are input from the video recording input terminal 131, compression-coded by the DV encoder 132, and recorded by-the recording and reproducing section 133.

At the time of reproduction, the signals reproduced by the recording and reproducing section 133 are decompression-decoded by the DV decoder 134, and the. resultant signals are output to the video reproduction output terminal 135. The signals are monitored by the image receiving apparatus 140.

The maximum recording time of DV format VTRs is 4 hours and 30 minutes when a standard cassette tape is used. Even when the thin tape for VHS VTRs is used in the three times mode, the maximum recording time is only 8 hours. Recording times of these lengths are insufficient to-record a multiplicity of programs on a multiplicity of channels of digital TV broadcasts by programming the VTR to do so by use of a timer in advance (hereinafter, referred to as timer recording).

In multi-channel digital broadcasts, since the number of programs broadcasted for a week is great, it is considered that a great number of programs are programmed to be recorded in one timer recording setting. Moreover, an occasion will be more likely to arise when programs on a plurality of channels broadcasted during the same time period are to be recorded at the same time. However, the present VHS format VTRs and DV format VTRs with short recording times cannot satisfactorily meet such a demand.

Therefore, paying attention to the fact that the compression rate of the MPEG2 format is much higher than that of the DV format, a method can be considered that uses an MPEG2-format VTR instead of the DV format VTR of FIG. 6 in order to increase the recording time. The recording rate of the DV format is 41.85 Mbits/second including sound and sub codes (see Nikkei Electronics Books "Data ashuku gijitsu (Data compression technology)", p144). On the contrary, when standard television signals are coded according to the MPEG2 format, the information amount is 6 to 8 Mbits/second (see Bulletin of the Institute of Image Information and Television Engineers, Vol. 50, No. 1 (1996), p40). Therefore, when an MPEG2-format VTR is used, recording can be performed for a time five to seven times longer. However, in the system configuration of FIG. 6, since MPEG2-format digital broadcast signals are decoded by the MPEG2 decoder 124 in the receiver 120 called Set Top Box, the signals decoded as data to be supplied to the MPEG2-format VTR are necessarily converted again to MPEG2-format signals by use of an MPEG2 encoder. Since the MPEG2 encoder requires very complicated signal processing compared with the MPEG2 decoder, the circuit scale thereof is enormous and is expensive. Therefore, at the present time, it is considerably difficult to employ this for home appliances in view of the cost.

Objects of the present invention are to solve the above-mentioned problems, to realize long-time digital recording without the use of the expensive MPEG2 encoder for recording and reproduction of the digital broadcasts, and moreover to realize a digital broadcast recording and reproducing apparatus capable of simultaneous timer-recording programs on a plurality of channels.

DISCLOSURE OF THE INVENTION

In order to meet the above-mentioned objects, a digital broadcast recording and reproducing apparatus according to the present invention comprises: a tuner section for demodulating a received compression-coded digital broadcast signal corresponding to a multiplicity of channels into a data string including coded data; recording channel selection means for selecting coded data of channels to be recorded from the above-mentioned data string, and outputting a formed data string; recording and reproducing means for recording and reproducing the data string output from the above-mentioned recording channel selection means; and a decoder for decompression-decoding the coded data of the data string reproduced by the above-mentioned recording and reproducing means, and outputting a video signal. According to this configuration, by recording the data string of the compression-coded digital broadcast signal to the recording and reproducing means, and decompression-decoding the reproduction output of the recording and reproducing means by a decoder, a long time digital recording of digital broadcasts can be performed without use of the encoder.

Furthermore, a digital broadcast recording and reproducing apparatus according to another aspect of the present invention comprises reproducing channel selection means. The reproducing channel selection means selects coded data corresponding to one target channel from the data string of a plurality of channels reproduced by the recording and reproducing means where the data string of a plurality of channels is recorded, and selectively outputs a formed data string to the decoder. According to this configuration, programs on a plurality of channels can be recorded onto one recording medium.

Furthermore, a digital broadcast recording and reproducing apparatus according to another aspect of the present invention comprises a plurality of tuner sections and recording channel selection means and comprises data string multiplexing means for multiplexing a plurality of pairs of data strings output from the recording channel selection means into one data string. According to this configuration, programs on a multiplicity of arbitrary channels can be recorded onto one recording medium.

Furthermore, the recording and reproducing means is magnetic recording and reproducing means for recording onto magnetic tape by a rotary head, and switching the running speed of the magnetic tape in accordance with the number of channels to be recorded, and according to this configuration, when the number of channels to be recorded is small, the recording time is increased and recording can be performed for a long time.

Furthermore, by performing recording of N times (N is the number of channels to be recorded) every M scannings by the rotary head (M is the maximum number of recordable channels), the track pitch is fixed even if the number of channels to be recorded is changed.

Furthermore, when N is a divisor of M, the magnetic recording and reproducing apparatus transports the magnetic tape at a constant speed of N/M times of the speed when the number of channels to be recorded is M, and performs recording once every M/N scannings by the rotary head. According to this configuration, intermittent recording intervals are fixed, so that the recording track pitch is fixed.

Furthermore, when N is not a divisor of M, recording is performed M times every M scannings by the rotary head, and the data string output from the recording channel selection means is recorded in N times therein. According to this configuration, the recording track pitch is fixed even when N is not a divisor of M.

Furthermore, when the number M in the magnetic recording and reproducing means is six or four, the case more frequently occurs where N is a divisor of M, so that the case more frequently occurs where intermittent recording can be performed at fixed intervals without any waste.

Furthermore, recording and reproducing means according to another aspect is magnetic recording and reproducing means configured so as to record an identification signal for identifying the number of channels to be recorded at the time of recording. According to this configuration, at the time of reproduction, the running speed of the magnetic tape can be switched so as to be the same as it is at the time of recording.

Furthermore, magnetic recording and reproducing means according to another aspect is configured so as to perform recording with the identification signal being changed immediately before the number of channels to be recorded is changed. According to this configuration, disturbance of reproduction can be prevented.

Furthermore, magnetic recording and reproducing apparatus according to another aspect comprises timer recording setting means, and is configured so that an alarm is provided when the number of channels which overlap in setting exceeds the maximum number of recordable channels of the recording and reproducing means. According to this configuration, misoperation of timer setting can be prevented.

EMBODIMENTS

Hereinafter, preferred embodiments of the present invention will be described with respect to embodiments shown in FIG. 1 to FIG. 5.

<<First Embodiment>>

Figure 1:
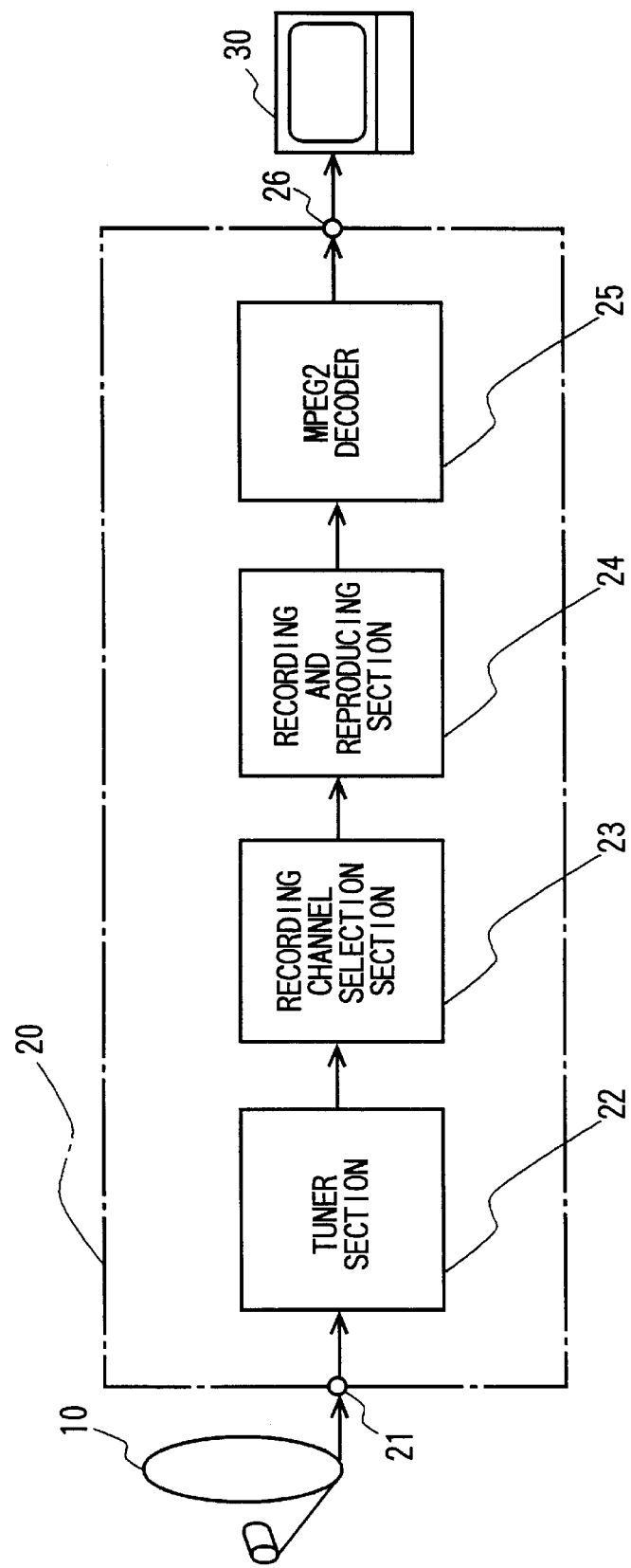
FIG. 1 is a view showing a system configuration including a digital broadcast recording and reproducing apparatus according to a first embodiment of the present invention.

FIG. 1 is a view showing a system configuration of a digital broadcast recording and reproducing apparatus 20 according to a first embodiment.

In FIG. 1, an antenna 10 is the one for receiving radio waves from a satellite. The output terminal of the antenna 10 is connected to an antenna input terminal 21 of the digital broadcast recording and reproducing apparatus 20. The antenna input terminal 21 is connected to the input terminal of a tuner section 22. An output terminal of the tuner section 22 from which a bit stream which is a data string including the coded data of a multiplicity of channels is connected to the input terminal of a recording channel selection section 23 for selecting the coded data of a target channel from the bit stream. An output terminal for outputting the data string from the recording channel selection section 23 is connected to an input terminal of a recording and reproducing section 24, and an output terminal of the recording and reproducing section 24 which records to and reproduces from a magnetic tape by a rotary head is connected to the input terminal of an MPEG2 decoder 25. The output terminal of the MPEG2 decoder 25 is connected to a video output terminal 26 of the digital broadcast recording and reproducing apparatus 20. The video output terminal 26 is to be connected to an image receiving apparatus 30. Where, the recording and reproducing section 24 is, specifically, an MPEG2-format magnetic recording and reproducing apparatus such as a digital video tape recorder for recording signals compression-coded according to the MPEG2 format onto the magnetic tape by use of the rotary head.

The operation to record and reproduce a program of a digital TV broadcast to and from the digital broadcast recording and reproducing apparatus in the above-described configuration will be described in detail.

Radio waves of a digital TV broadcast from the satellite are received by the antenna 10, and the received signals are supplied to the digital broadcast recording and reproducing apparatus 20. In the digital broadcast recording and reproducing apparatus 20, the signals are received by the antenna input terminal 21 and demodulated by the tuner section 22, and a bit stream is output. The bit stream comprises a string of transport stream packets with a fixed length of 188 bytes. The transport stream packets each include a PID (packet ID) which is an identifier for identifying the channels. By collecting the transport stream packets having the same PID, the coded data of the channel can be formed. Therefore, at the recording channel selection section 23, only the transport stream packets having the PID of the channel desired to be recorded are extracted and formed into a data string. The data string is recorded by the recording and reproducing section 24.

At the time of reproduction, the data string reproduced by the recording and reproducing section 24 is decompression-decoded by the MPEG2 decoder 25 and put back into video signals, and output to the video output terminal 26. The signals are monitored by the image receiving apparatus 30.

As described above, according to this embodiment, data of a digital TV broadcast of the MPEG2 format having a high compression rate are recorded to an MPEG2-format VTR, and the reproduced data are decompression-decoded by the MPEG2 decoder. Consequently, digital recording of digital broadcasts can be performed for a time five to seven times longer than the recording time of the conventional DV format VTR without the use of the expensive MPEG2 encoder.

<<Second Embodiment>>

The digital recording and reproducing apparatus according to the first embodiment is capable of long-time recording; however, since digital broadcasts feature a multiplicity of channels, there are occasions when simultaneous recording of programs on a plurality of channels is desired. Therefore, a second embodiment that is for enabling simultaneous recording of programs on a plurality of channels will be described hereafter.

Figure 2:
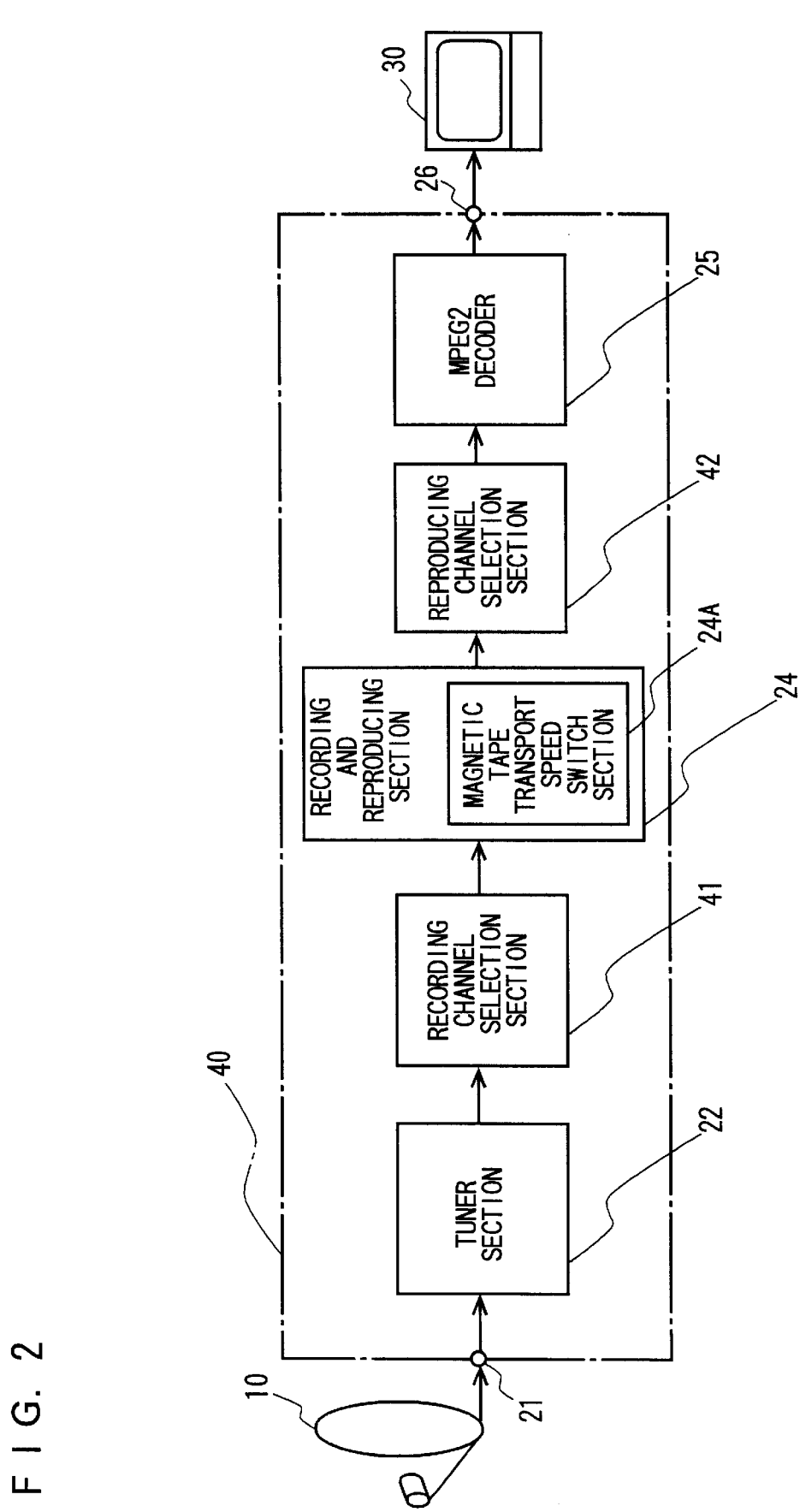
FIG. 2 is a view showing a system configuration including a digital broadcast recording and reproducing apparatus according to a second embodiment of the present invention.

FIG. 2 is a view showing a system configuration including a digital broadcast recording and reproducing apparatus according to the second embodiment of the present invention.

In FIG. 2, the same elements as those of FIG. 1 are denoted by the same reference numerals. The output terminal of the antenna 10 is connected to the antenna input terminal 21 of a digital broadcast recording and reproducing apparatus 40. The antenna input terminal 21 is connected to the input terminal of the tuner section 22. The output terminal of the tuner section 22 is connected to the input terminal of a recording channel selection section 41. The output terminal of the recording channel selection section 41 is connected to the input terminal of the recording and reproducing section 24. The output terminal of the recording and reproducing section 24 is connected to the input terminal of a reproducing channel selection section 42. The output terminal of the reproducing channel selection section 42 is connected to the input terminal of the MPEG2 decoder 25. The output terminal of the MPEG2 decoder 25 is connected to the video output terminal 26 of the digital broadcast recording and reproducing apparatus 40. The video output terminal 26 is to be connected to the input terminal of the image receiving apparatus 30. The digital broadcast recording and reproducing apparatus 40 of the second embodiment has the recording channel selection section 41 and the reproducing channel selection section 42 that are different from those of the first embodiment. The recording channel selection section 23 of FIG. 1 selects the coded data of one channel from the bit stream from the tuner section 22, whereas the recording channel selection section 41 of FIG. 2 selects the coded data of one channel or a plurality of channels from the bit stream from the tuner section 22. The reproducing channel selection section 42 selects the coded data of a target channel from the coded data of one channel or a plurality of channels reproduced from the recording and reproducing section 24 and outputs the formed data string.

The operation to record and reproduce a program of a digital broadcast to and from the digital broadcast recording and reproducing apparatus in the above-described configuration will be described with a focus on the portion different from that of the first embodiment.

At the recording channel selection section 41 of the digital broadcast recording and reproducing apparatus 40, only the transport stream packets having the PID of the channel to be recorded are extracted from the bit stream output from the tuner section 22, and formed into a data string. Here, the number of channels to be recorded may be one, or two or more. This data string is recorded by the recording and reproducing section 24.

At the time of reproduction, in the reproducing channel selection section 42, only the transport stream packets having the PID of a channel desired to be reproduced are extracted from the data string reproduced by the recording and reproducing section 24, and formed into a data string. Where, the desired number of channels is one. The data string is decompression-decoded by the MPEG2 decoder 25 and put back into video signals, and output to the video output terminal 26.

Figure 3:
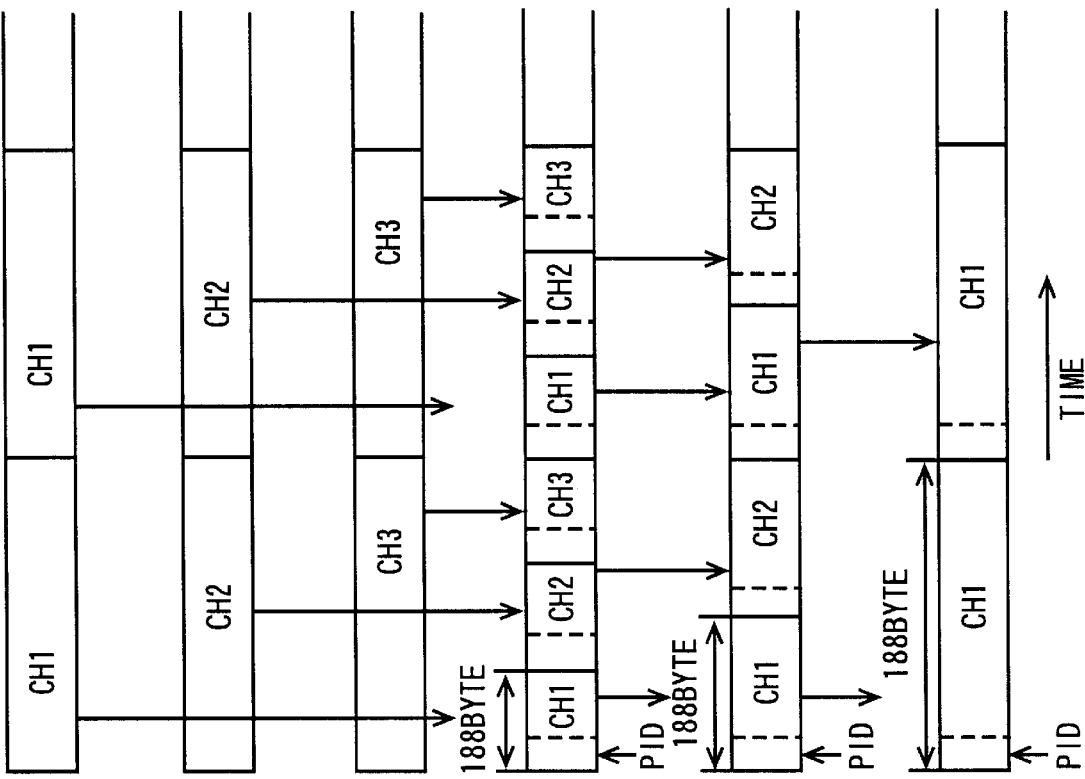
FIG. 3 is a timing chart showing the relationship among data strings of sections of the digital broadcast recording and reproducing apparatus of FIG. 2.

The above-described operation will be described by use of FIG. 3 with respect to a case where the number of receiving channels is three and the number of recording channels is two. FIG. 3 is a timing chart showing the relationship among data strings of the parts of the digital broadcast recording and reproducing apparatus 40 of FIG. 2.

In FIG. 3, a data string (a) shows the coded data string of a channel 1 (CH1), and a data string (b) shows the coded data string of a channel 2 (CH2). A data string (c) shows the coded data string of a channel 3 (CH3), and a data string (d) shows the data string (bit stream) of the output of the tuner section 22. Moreover, a data string (e) shows the data string (data string to be recorded and reproduced) of the output of the recording channel selection section 41, and a data string (f) shows the data string of the output of the reproducing channel selection section 42. The data string (d) comprises the transport stream packets of CH1, CH2 and CH3 aligned in this order. Each of the transport stream packets is a 188-byte packet including the PID for identifying the channel number. The recording channel selection section 41 selects the packets of CH1 and CH2 from the data string and forms the data string (e), which is recorded by the recording and reproducing section 24. The reproducing channel selection section 42 selects the packet of CH1 from the reproduced data string (e) and forms the data string (f), which is to be decompression-decoded by the MPEG2 decoder 25.

When the data rate per channel is fixed, the data rate of recording by the recording and reproducing section 24 becomes high in proportion to the number of channels to be recorded. When the rotation speed of the rotary head of the recording and reproducing section 24 is fixed, the maximum number of recordable channels is decided by the limitation of the recording wavelength. When the maximum number of recordable channels is M (M is a positive integer), in the case where only one channel is recorded, recording is intermittently performed once every M scannings by the rotary head. By setting the transport speed of the magnetic tape so as to be 1/M the speed for recording M channels (hereinafter, referred to as preset transport speed), the recording track pitch becomes constant. To perform the above-mentioned intermittent recording, the recording and reproducing section 24 shown in FIG. 2 is provided with a magnetic tape transport speed switch section 24A.

When the number of channels to be recorded is N (N is a positive integer equal to or lower than M), recording is intermittently performed N times every M scannings by the rotary head, and the transport speed of the magnetic tape can be set so as to be N/M the preset transport speed. At this time, the transport speed of the magnetic tape is not necessarily constant. For example, for M scannings by the rotary head, the magnetic tape is transported at the preset transport speed in N scannings and is stopped in M-N scannings so that the transport speed can be N/M the preset transport speed on the average.

At the time of reproduction, the magnetic tape is transported at the same speed as that of recording, and reproduction can be intermittently performed in a similar manner. With respect to the transport speed of the magnetic tape at this time, the intermittent transport in which the preset transport speed and stopping are combined may be performed. When the magnetic tape is transported at a constant speed which is N/M the preset speed and the same track is reproduced a plurality of times, a method that uses the one including the fewest errors of them may be used.

By thus varying the transport speed of the magnetic tape in accordance with the number of channels to be recorded, recording can be performed for a long period of time when the number of channels is small. Consequently, the magnetic tape can be effectively used.

With respect to the magnetic tape transport in the time of recording, constant-speed transport is more desirable than the intermittent transport because it is more easily controlled. However, in the case of constant-speed transport, according to the relationship between the maximum number M of recordable channels and the number N of channels to be recorded, it is sometimes difficult to fix the recording track pitch.

Where, when scanning where recording is performed every scanning by the rotary head is represented by a pattern o and scanning where no recording is performed is represented by a pattern x, for example, in the case that the maximum number M of recordable channels is five and the number N of channels to be recorded is two, there is two types of patterns o o x x x or o x o x x for five scannings by the rotary head. Therefore, selection of any of the patterns does not make the interval of the intermittent recording fixed, so that the recording track pitch is not fixed.

When the maximum number M of recordable channels is six and the number N of channels to be recorded is two, the interval is fixed when the pattern is o x x o x x for six scannings by the rotary head. When the pattern is o o x x x x or o x o x x x, the interval is not fixed, so that the recording track pith is not fixed.

Thus, the recording track pitch is not always fixed, when N is not a divisor of M, or even when N is a divisor of M, according to the pattern of the intermittent recording.

A case will be described where the maximum number M of recordable channels is six.

When the number N of channels to be recorded is one, recording is intermittently performed once every six scannings by the rotary head. By fixing the transport speed of the magnetic tape to 1/6 the preset speed, the recording track pitch is the fixed preset pitch.

When the number N of channels to be recorded is two, recording is intermittently performed once every three scannings by the rotary head. By fixing the transport speed of the magnetic tape to 2/6 the preset speed, the recording track pith is the fixed preset pitch.

When the number N of channels to be recorded is three, recording is intermittently performed once every two scannings by the rotary head. By fixing the transport speed of the magnetic tape to 3/6 the preset speed, the recording track pitch is the fixed preset pitch.

As described above, by setting the maximum number M of recordable channels to 6, the recording track pitch is the fixed preset pitch by intermittently performing recording once every M/N scannings by the rotary head, when the number N of channels to be recorded is one, two and three, that is, when N is a divisor of M or one.

As described later, the number N of channels to be recorded becomes plural, for example, when the time periods of the programs which this digital broadcast recording and reproducing apparatus is programmed to record with a timer overlap one another. Therefore, the case where the number N of channels to be recorded is one most probably occurs, and the probability decreases as N increases like 2, 3, 4, . . .

Consequently, when the maximum number M of recordable channels is six, the number N of channels to be recorded is one, two or three in most cases. Therefore, practically, consideration of only these cases is sufficient.

However, there is a possibility that the number N of channels to be recorded is four or more. Therefore, when N is four or five which is not a divisor of M, like the case where N is six, recording is performed every scanning by the rotary head, that is, six times every six scannings. Of the six scannings, in the four or five scannings, the data string of the channel selected by the recording channel selection section 41 is recorded, and in the remaining two or one scanning, a blank data string may be recorded. Alternatively, the data strings of some channels may be recorded again. In this case, although the data strings are useless, this is not a serious problem in practical use because the probability that these cases occur is low.

As described above, in a case where the maximum number M of recordable channels is set to six, when the number N of channels to be recorded is one, two, three and six, the recording track is not wasted at all and the recording track pitch is fixed.

Likewise, in the case where the maximum number M of recordable channels is set to four, when the number N of channels to be recorded is one, two and four, the recording track is not wasted at all and the recording track pitch is fixed.

As described above, when the maximum number M of recordable channels is set to six or four, since these numbers include more devisors than other numbers and the divisors are continuous from the lowest value, the recording track is not wasted in most cases in practical use and the recording track pitch can be fixed.

The maximum number M of recordable channels may be set to any number other than prime numbers.

As mentioned previously, instead of intermittently recording of N times every M scannings by the rotary head, recording may be continuously performed with the rotation speed of the rotary head being set to N/M. In this case, however, when timer recording is performed as described later, there are cases where the number of channels to be recorded changes during recording and the rotation speed of the rotary head changes accordingly. Since the rotary head having inertia cannot change the rotation speed immediately, there are cases where the recording operation is temporarily disturbed. At this time, the recording operation of a channel being continuously recorded is also disturbed. Therefore, in such a case, it is more desirable to intermittently recording with the rotation speed of the rotary head being fixed.

At the time of reproduction, it is necessary to switch the transport speed of the magnetic tape in accordance with the number of recorded channels. To do so, it is necessary to identify how many channels are recorded on the portion of the magnetic tape being currently reproduced. To do so, it is preferable that an identification signal for identifying the number N of channels to be recorded at the time of recording is recorded together with the data string. The identification signal may be embedded in the data string to be recorded or may be recorded in a portion other than the portion of the data string.

It is preferable that the identification signal is recorded not only at the start of recording of each channel but also always during recording. By doing so, even when reproduction is started from an arbitrary position of the magnetic tape, the number N of channels to be recorded of the portion is found in an instant and reproduction can be performed after the transport speed is changed to the speed in accordance with it. Moreover, recording can be performed with the identification signal being changed to an identification signal in accordance with the next number N of channels to be recorded immediately before the number of channels to be recorded N is changed (for example, one frame before). By doing so, even if the number of channels N is changed during reproduction, this can be found in advance, so that an instruction to change the transport speed can be provided in time for the change of the number of channels to be recorded. As a result, the reproduced images are never disturbed.

<<Third Embodiment>>

A third embodiment will be described with reference to FIG. 4.

A satellite for digital TV broadcasts normally has several transponders. By multiplexing programs on several channels per transponder, a multiplicity of programs are simultaneously transmitted over a multiplicity of channels. Therefore, there are occasions when a plurality of programs arbitrarily selected from the multiplicity of programs are desired to be recorded. However, in the case of one tuner section 22 and one recording channel selection section 41 shown in the digital broadcast recording and reproducing apparatus 40 of FIG. 2, selection can be made only from a plurality of programs transmitted from one transponder.

Figure 4:
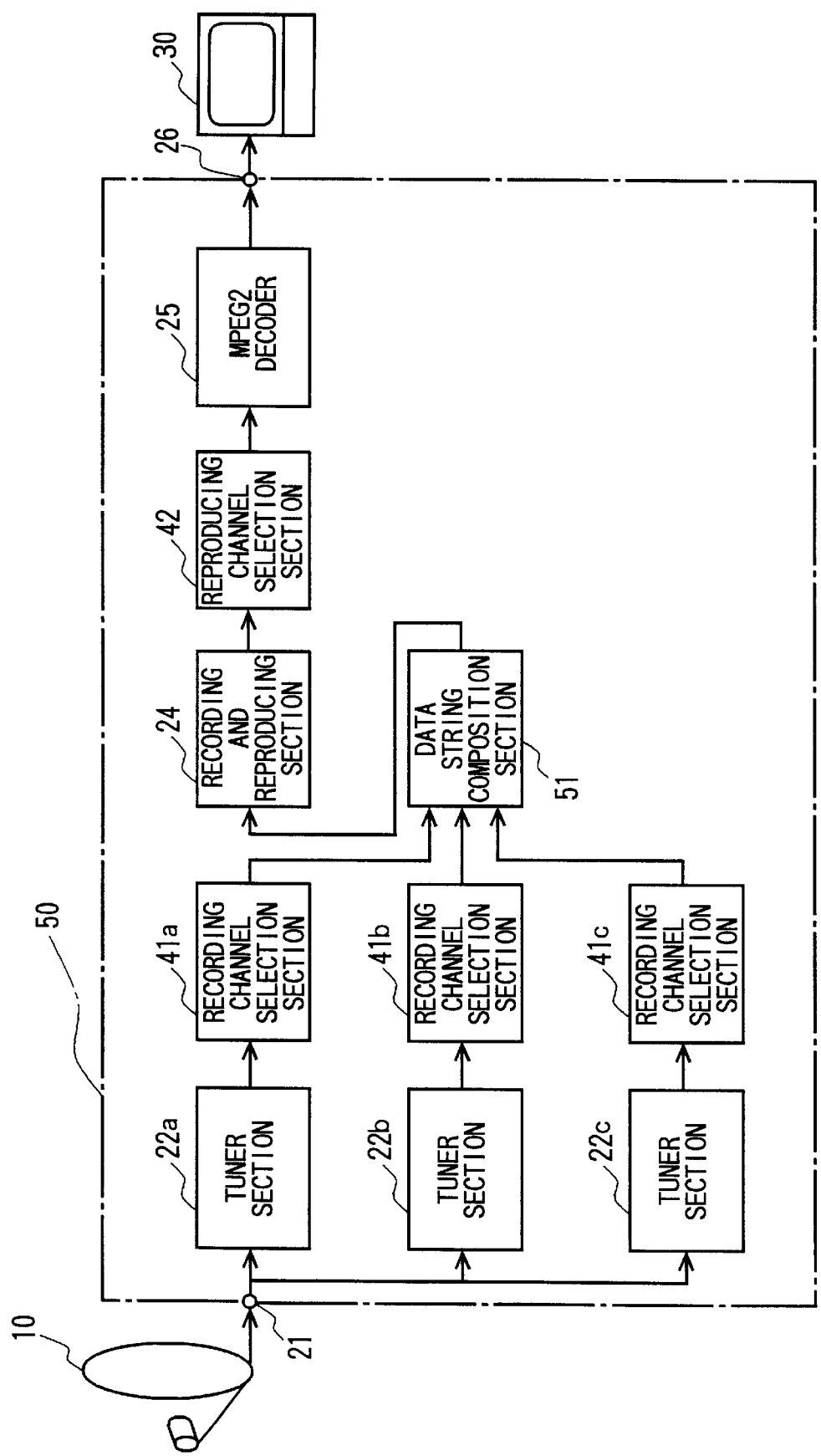
FIG. 4 is a view showing a system configuration including a digital broadcast recording and reproducing apparatus according to a third embodiment of the present invention.

To solve such a problem, in the embodiment shown in FIG. 4, by providing a plurality of tuner sections 22 and recording channel selection sections 41, it was enabled to record a plurality of programs arbitrarily selected from multi-channel multiplex broadcasts by a plurality of transponders. FIG. 4 is a view showing a system configuration including a digital broadcast recording and reproducing apparatus 50 according to the third embodiment of the present invention.

In FIG. 4, the same elements as those of FIG. 2 are denoted by the same reference numerals and the description is omitted. The output terminal of the antenna 10 is connected to the antenna input terminal 21 of the digital broadcast recording and reproducing apparatus 50. The antenna input terminal 21 is connected to the input terminals of tuner sections 22a, 22b and 22c. The output terminals of the tuner sections 22a, 22b and 22c are connected to the input terminals of recording channel selection sections 41a, 41b and 41c. The output terminals of the recording channel selection sections 41a, 41b and 41c are connected to the input terminals of a data string composition section 51. The output terminal of the data string composition section 51 is connected to the input terminal of the recording and reproducing section 24. The output terminal of the recording and reproducing section 24 is connected to the input terminal of the reproducing channel selection section 42. The output terminal of the reproducing channel selection section 42 is connected to the input terminal of the MPEG2 decoder 25. The output terminal of the MPEG2 decoder 25 is connected to the video output terminal 26. The video output terminal 26 is connected to the input terminal of the image receiving apparatus 30. The three tuner sections 22a, 22b and 22c receive broadcasts of different frequencies and apply them to the recording channel selection sections 41a, 41b and 41c, respectively. The outputs of the recording channel selection sections 41a, 41b and 41c are input to the data string composition section 51 which composites data into a time series of data strings and outputs them to the recording and reproducing section 24.

The operation of the digital broadcast recording and reproducing apparatus configured as mentioned above will be described.

For example, in the case that there are three transponders, which are designated as A, B and C, respectively, if each of the transponders A, B and C have four channels, the total number of channels is twelve. These channels are designated as A1, A2, A3, A4, B1, B2, B3, B4, C1, C2, C3 and C4.

Now, in the case that the channels A2 and B1 are recorded during a certain time period, the tuner section 22a receives the signal from the transponder A and outputs the bit stream corresponding to the transponder A. The recording channel selection section 41a selects the channel A2 from the output of the tuner section 22a and outputs the data string of the channel A2. Furthermore, the tuner section 22b receives the signal from the transponder B and outputs the bit stream corresponding to the transponder B. The recording channel selection section 41b selects the channel B1 from the output of the tuner section 22b and outputs the data string of the channel B1. The data string of the channel A2 and the data string of the channel B1 are composited by the data string composition section 51 and the data string of the channels A2 and B1 is output to the recording and reproducing section 24. At this time, the transport speed of the magnetic tape is 2/M the preset transport speed.

Subsequently, in the case that the channel C4 is added at a certain time and the channels A2, B1 and C4 are recorded, the tuner section 22c receives the signal from the transponder C and outputs the bit stream corresponding to the transponder C. The recording channel selection section 41c selects the channel C4 from the output of the tuner section 22c and outputs the data string of the channel C4 to the data string composition section 51. The data string composition section 51 forms the data string of the channels A1, B1 and C4 and outputs it to the recording and reproducing section 24. At the time, the transport speed of the magnetic tape changes to 3/M the preset transport speed.

Thus, it is possible to simultaneously record three or less channels arbitrarily selected from multi-channel multiplex broadcasts broadcast from a plurality of transponders. Furthermore, by increasing the number of tuner sections 22a to 22c and the number of recording channel selection sections 41a to 41c, the broadcasts of the channels of the maximum recordable number M of channels can be simultaneously recorded at the maximum.

<<Fourth Embodiment>>

A fourth embodiment will be described with reference to FIG. 5.

In order to record the broadcasts, a timer is frequently used. In multi-channel multiplex digital broadcasts, information on the weekly program schedule of each channel and the categories and the names of the programs, so-called electric program guide (hereinafter, referred to as EPG) is transmitted together with picture information. To set timer recording, a program to be recorded is selected by use of a cursor, etc. from a weekly program schedule by channel or by category displayed on the display screen of the image receiving apparatus based on the EPG information.

Figure 5:
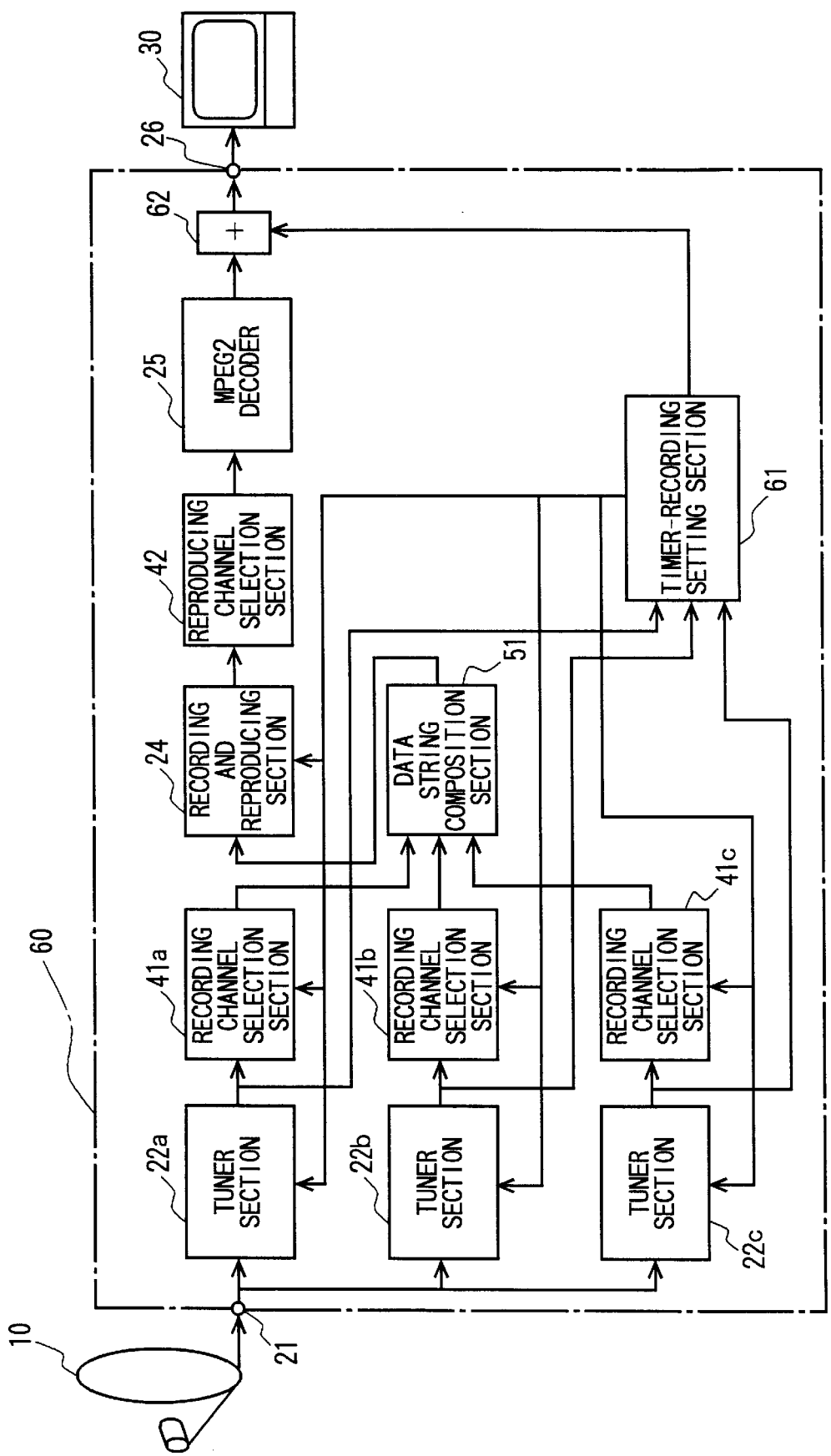
FIG. 5 is a view showing a system configuration including a digital broadcast recording and reproducing apparatus according to a fourth embodiment of the present invention.
Figure 6:
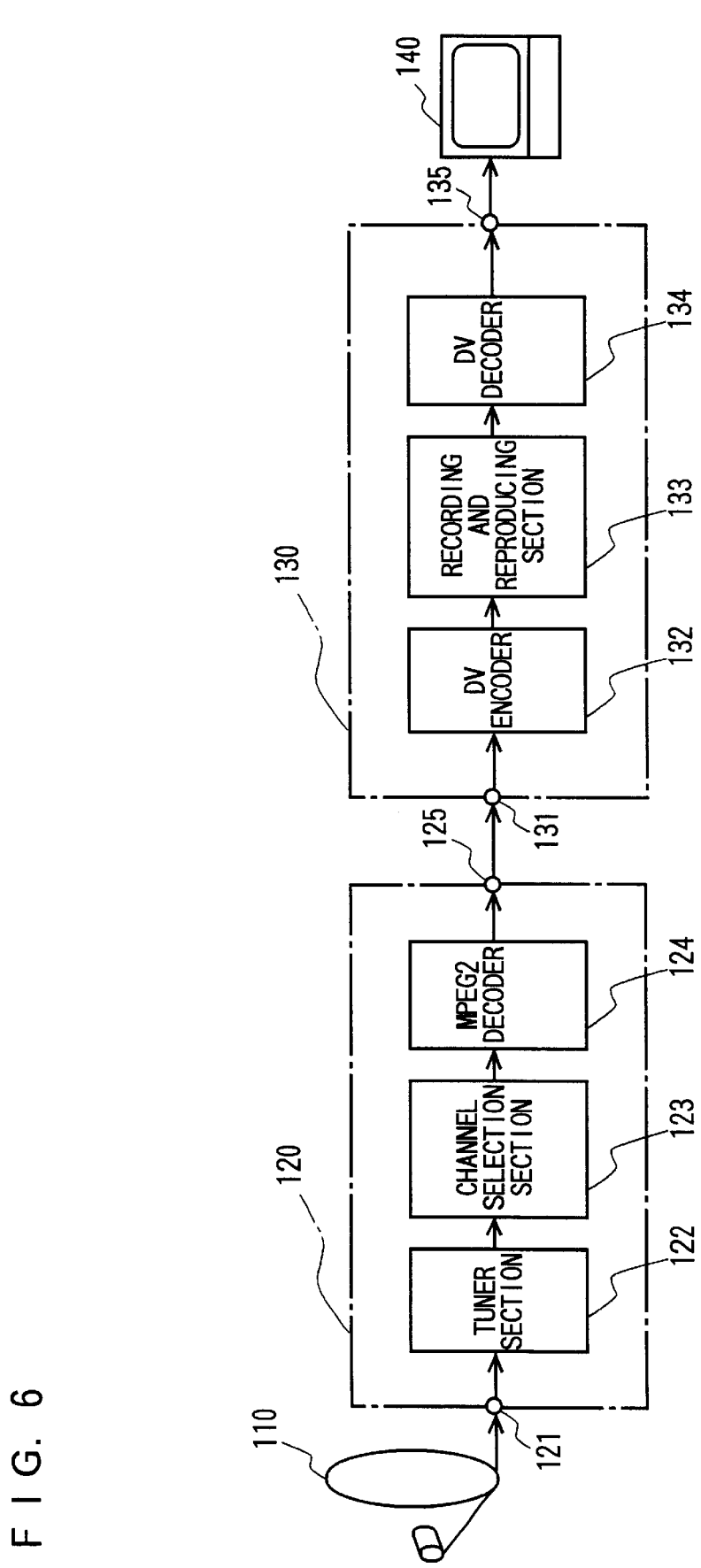
FIG. 6 is the view showing the conventional system configuration for recording digital broadcast programs to a DV format VTR.

FIG. 5 is a view showing a system configuration including a digital broadcast recording and reproducing apparatus 60 according to the fourth embodiment of the present invention.

In FIG. 5, the same elements as those of FIG. 4 are denoted by the same reference numerals and will not be described. The output terminal of the antenna 10 is connected to the antenna input terminal 21 of the digital broadcast recording and reproducing apparatus 60. The antenna input terminal 21 is connected to the input terminals of the tuner sections 22a, 22b and 22c. The output terminals of the tuner sections 22a, 22b and 22c are connected to the input terminals of the recording channel selection sections 41a, 41b and 41c, respectively. The output terminals of the tuner sections 22a, 22b and 22c are also connected to the input terminals of a timer recording setting section 61. The output terminals of the recording channel selection sections 41a, 41b and 41c are connected to the input terminals of the data string composition section 51. The output terminal of the data string composition section 51 is connected to the input terminal of the recording and reproducing section 24. The output terminal of the recording and reproducing section 24 is connected to the input terminal of the reproducing channel selection section 42. The output terminal of the reproducing channel selection section 42 is connected to the input terminal of the MPEG2 decoder 25. The output terminal of the MPEG2 decoder 25 is connected to the input terminal of an EPG information on-screen section 62. The output terminal of the EPG information on-screen section 62 is connected to the video output terminal 26 of the digital broadcast recording and reproducing apparatus 60. The video output terminal 26 is to be connected to the input terminal of the image receiving apparatus 30. An output terminal of the timer-recording setting section 61 is connected to the tuner sections 22a, 22b and 22c, the recording channel selection sections 41a, 41b and 41c, and the recording and reproducing section 24. The other output terminal of the timer-recording setting section 61 is connected to the EPG information on-screen section 62. The digital broadcast recording and reproducing apparatus 60 has the timer-recording setting section 61 and the EPG information on-screen section 62 in addition to the elements of FIG. 4.

The operation of the digital broadcast recording and reproducing apparatus 60 configured as mentioned above will be described.

First, the timer-recording setting section 61 detects the EPG information from the bit streams output from the tuner sections 22a, 22b and 22c. The EPG information is applied to the EPG information on-screen section 62, superimposed on the video signals output from the MPEG2 decoder 25, and displayed on the image receiving apparatus 30, for example, as a weekly program schedule list. When a non-illustrated cursor is placed on a program to be recorded in the weekly program schedule list, since the timer-recording setting section 61 grasps the cursor position, the program can be selected, for example, by pressing a setting button at the cursor position. Timer recording can be set in the timer-recording setting section 61. When the set time comes, the timer-recording setting section 61 automatically provides the tuner sections 22a, 22b and 22c, the recording channel selection sections 41a, 41b and 41c and the recording and reproducing section 24 with a channel selection and recording instruction, and starts recording.

As a result of thus setting the timer recording, it sometimes occurs that the time periods of a plurality of set programs wholly or partly overlap. In such a case, it occurs that during recording of one program, recording of another program is started and the transport speed of the magnetic tape changes at the time.

In the case of the digital broadcast recording and reproducing apparatus of FIG. 5, the number of channels that can be arbitrarily selected and simultaneously recorded is three. Therefore, if the number of channels more than three is set in the same time period in the timer recording setting, it is impossible to record all the set channels. Such a misoperation can be prevented by preparing so as to provide an alarm such as a beep tone or a warning display when the number of set channels exceed the maximum number of channels that can be simultaneously recorded in the timer recording setting. This alarm can be used also as a warning provided when the sum total of the times of all the set programs exceed the remaining time of the magnetic tape.

Well, in the case that the address of a timer recording start point on the magnetic tape is known, by combining the address and the EPG information, the addresses of the recording start points and end points of all the time-recording-set programs are found through calculation. Consequently, contents information (TOC) of all the time-recording-set programs can be automatically formed. By storing the contents information, for example, in a non-volatile memory provided in the magnetic tape cassette, it is facilitated to locate the start of a program at the time of reproduction. By adding program categories, etc. to the contents information, retrieval based on the category is possible at the time of reproduction.

Incidentally, as to the recording and reproducing section 24 in the above-mentioned embodiments, although a recording and reproducing apparatus which performs recording onto magnetic tape by a rotary head is used, one that performs recording and reproduction to and from disks may be used as other one.

Moreover, with respect to media of the digital broadcast, the present invention is not limited to the one by satellite broadcasting described in the above embodiments, but is applicable to other media such as ground wave broadcasting and cable television.

INDUSTRIAL APPLICABILITY

As described in the respective embodiments, according to the present invention, the digital broadcast recording and reproducing apparatus is provided with the tuner section for receiving digital broadcasts of MPEG2-format, the recording channel selection section, the recording and reproducing section and the MPEG2 decoder. Consequently, a digital broadcast signal compression-coded according to the MPEG2 format is received by the tuner, and the coded data of the channel to be recorded is selected from a plurality of output data strings by the recording channel selection section. The selected coded data is recorded or reproduced by the recording and reproducing section of the MPEG2-format and decompression-decoded by the MPEG2 decoder, and a video signal is output by decompression-decoding by the MPEG2 decoder. Therefore, a long time digital recording of digital broadcasts can be performed without the use of the expensive MPEG2 encoder.

Moreover, by providing the reproduced channel selection section for selecting the coded data corresponding to one channel from the reproduced data string, programs on a plurality of channels can be recorded onto one recording medium.

A plurality of tuner sections and recording channel selection sections are provided, and the data string composition section is provided for merging a plurality of pairs of data strings output therefrom. As a result, programs on the respective channels of a plurality of arbitrary broadcasts can be recorded onto one recording medium.

Moreover, by providing the magnetic tape transport speed switch section in the recording and reproducing section and switching the transport speed of the magnetic tape in accordance with the number of channels to be recorded, recording can be performed for a long time when the number of channels to be recorded is small.

Furthermore, in the case that N times of recording is performed (N is the number of channels to be recorded) every M times of scanning by the rotary head of the recording and reproducing section (M is the maximum number of recordable channels), the track pitch becomes constant even if the number of channels to be recorded is changed.

Furthermore, by performing recording once every M/N times of scanning by the rotary head when the number N of channels to be recorded is a divisor of the maximum number M of recordable channels, and by performing M times of recording every M times of scanning by the rotary head when the number N of channels to be recorded is not a divisor of the maximum number M of recordable channels, the recording track pitch becomes constant.

Furthermore, in the case that the maximum number M of recordable channels is six or four, the case more frequently occurs where the number N of channels to be recorded is a divisor of the maximum number M of recordable channels, so that the case more frequently occurs where intermittent recording can be performed at fixed intervals without any waste.

Furthermore, in the case that the identification signal for identifying the number of channels to be recorded is recorded, at the time of reproduction, the transport speed of the magnetic tape can be switched so as to be the same speed as that at the time of recording.

Furthermore, in the case that recording is performed with the identification signal being changed immediately before the number of channels to be recorded is changed, the reproduced images can be prevented from being disturbed.

Furthermore, in the case that the number of timer-recording-set channels whose time periods overlap exceed the maximum number M of channels, misoperation of timer setting can be prevented by providing an alarm.

Although the invention has been described in its preferred form with a certain degree of particularity, it is understood that the present disclosure of the preferred form has been changed in the details of construction and the combination and arrangement of elements may be resorted to without departing from the scope and the spirit of the invention as claimed.

What is claimed is:

1. A digital broadcast recording and reproducing apparatus for receiving and recording a digital broadcast signal of which a data string including compression-coded data of video signals of a multiplicity of channels is modulated and transmitted, said digital broadcast recording and reproducing apparatus comprising:

a plurality of tuner sections each for demodulating the received digital broadcast signal into a data string including coded data corresponding respectively to a multiplicity of channels;

recording channel selection means for selection coded data corresponding to one or more channels to be recorded from the data string including the coded data corresponding to a multiplicity of channels which data string is demodulated by said tuners;

magnetic recording and reproducing means for recording and reproducing the data string selected by said recording channel selection means onto and from magnetic tape by a rotary head;

reproducing channel selection means for selecting coded data corresponding to one channel from the data string reproduced by said magnetic recording and reproducing apparatus, and outputting a formed data string;

a decoder for decompression-decoding coded data of the data string output from said reproducing channel selection means, and outputting a video signal;

timer-recording setting means capable of timer-recording setting of programs on a plurality of channels whose time periods partly or wholly overlap; and magnetic tape transport speed switching means for switching the transport speed of said magnetic tape when the number of channels whose time periods overlap changes while the magnetic recording and reproducing means is performing recording in accordance with the timer-recording setting means, wherein when the maximum number of channels recordable under the condition of a predetermined rotation speed of the rotary head of the magnetic recording and reproducing means is M (M being a positive integer), in the case where the number of channels to be recorded is N (N being a positive integer equal to or lower than M), the rotary head is rotated at the predetermined rotation speed, and N times of recording is performed every M times of scanning by the rotary head.

2. A digital broadcast recording and reproducing apparatus in accordance with claim 1 characterized in that said magnetic recording and reproducing means performs recording with the identification signal being changed immediately before the number of channels to be recorded is changed.

3. A digital broadcast recording and reproducing apparatus in accordance: with claim 1 characterized in that said timer-recording setting means comprises means for providing an alarm, when the number of set channels whose time periods overlap exceeds the maximum number of channels that can be simultaneously recorded by the recording and reproducing means.

4. A digital broadcast recording and reproducing apparatus in accordance with claim 1 characterized in that when the number N of channels to be recorded is a divisor of the maximum number M of recordable channels, said magnetic recording and reproducing apparatus transports the magnetic tape at a constant speed that is N/M the speed when the number of channels to be recorded is the maximum number M of recordable channels arid performs recording once every M/N times of scanning by the rotary head.

5. A digital broadcast recording and reproducing apparatus in accordance with claim 1 characterized in that when the number N of channel to be recorded is not a divisor of the maximum number M of recordable channels, said magnetic recording and reproducing means performs M times of recording every M times of scanning by the rotary head and records the data string output from the recording channel selection means in N times of scanning thereof.

6. A digital broadcast recording and reproducing apparatus in accordance with claim 1 characterized in that N in said magnetic recording and reproducing means is six or four.

7. A digital broadcast recording and reproducing apparatus for receiving and recording a digital broadcast signal of which a data string including compression-coded data of video signals of a multiplicity of channels is modulated and transmitted, said digital broadcast recording and reproducing apparatus comprising:

a plurality of tuner sections each for demodulating the received digital broadcast signal into a data string including coded data corresponding respectively to a multiplicity of channels;

a plurality of recording channel selection means each for selecting coded data corresponding to one or more channels to be recorded from the data string including the coded data corresponding to a multiplicity of channels which data string is demodulated by said tuners;

data string composition means for composing the coded data corresponding to a plurality of channels selected by said plurality of recording channel selection means into one data string;

magnetic recording and reproducing means for recording and reproducing the data string composed by said data string composition onto and from magnetic tape by a rotary head;

reproducing channel selection means for selecting coded data corresponding to one channel from the data string reproduced by said magnetic recording and reproducing apparatus, and outputting a formed data string;

a decoder for decompression-decoding coded data of the data string output from said reproducing channel selection means, and outputting a video signal; and magnetic tape transport speed switching means for switching the transport speed of said magnetic tape in accordance with the number of channels to be recorded wherein the magnetic recording and reproducing means sets the transport speed of the magnetic tape to a speed proportional to the number of channels to be recorded and, when the maximum number of channels recordable under the condition of a predetermined rotation speed of the rotary head of the magnetic recording and reproducing means is M, (M being a positive integer), in the case where the number of channels to be recorded is N, (N being a positive integer equal to or lower than M), the rotary head is rotated at the predetermined rotation speed, and N times of recording is performed every M times of scanning by the rotary head.

8. A digital broadcast recording and reproducing apparatus for receiving and recording a digital broadcast signal of which a data string including compression-coded data of video signals of a multiplicity of channels is modulated and transmitted, said digital broadcast recording and reproducing apparatus comprising:

a plurality of tuner sections each for demodulating the received digital broadcast signal into a data string including coded data corresponding respectively to a multiplicity of channels;

a plurality of recording channel selection means each for selecting coded data corresponding to one or more channels to be recorded from the data string including the coded data corresponding to a multiplicity of channels which data string is demodulated by said tuners;

data string composition means for composing the coded data corresponding to a plurality of channels selected by said plurality of recording channel selection means into one data string;

magnetic recording and reproducing means for recording and reproducing the data string composed by said data sting composition onto and from magnetic tape by a rotary head;

reproducing channel selection means for selecting coded data corresponding to one channel from the data string reproduced by said magnetic recording and reproducing apparatus, and outputting a formed data string;

a decoder for decompression-decoding coded data of the data string output from said reproducing channel selection means, and outputting a video signal; and magnetic tape transport speed switching means for switching the transport speed of said magnetic tape in accordance with the number of channels to be recorded, said magnetic recording and reproducing means comprising timer-recorder setting means capable of timer-recording setting of programs on a plurality of channels whose time periods partly or wholly overlap, and when the number of channels whose time periods overlap changes while the magnetic recording and reproducing means is performing recording in accordance with the timer-recording setting means, the transport speed of the magnetic tape is switched, said time-recording setting means comprising means for providing an alarm when the number of channels whose time periods overlap exceeds the maximum number of channels that can be simultaneously recorded by the recording reproducing means.

9. A digital broadcast recording and reproducing apparatus in accordance with claim 7 characterized in that when the number N of channels to be recorded is a divisor of the maximum number M of recordable channels, said magnetic recording and reproducing apparatus transports the magnetic tape at a constant speed that is N/M the speed when the number of channels to be recorded is the maximum number M of recordable channels, and performs recording once every M/N times of scanning by the rotary head.

10. A digital broadcast recording and reproducing apparatus in accordance with claim 9 characterized in that when the number N of channels to be recorded is not a divisor of the maximum number M of recordable channels, said magnetic recording and reproducing means performs M times of recording every M times of scanning by the rotary head, and records the data string output from the recording channel selection means in N times of scanning thereof.

11. A digital broadcast recording and reproducing apparatus in accordance with claim 8 characterized in that M in said magnetic recording and reproducing means is six or four.

* * * * *